United States Patent [19]

Bennett

[11] 4,133,481

[45] Jan. 9, 1979

[54] ANTI-SKID DEVICE FOR VEHICLES

[76] Inventor: Leslie B. Bennett, 1403 Selinger Ave., Erie, Pa. 16505

[21] Appl. No.: 861,530

[22] Filed: Dec. 19, 1977

[51] Int. Cl.² .......................... E01B 23/00; B32B 3/00
[52] U.S. Cl. .................................... 238/14; 428/167;
428/169; 428/172; 428/179; 428/180; 428/131
[58] Field of Search ............... 428/167, 169, 172, 179,
428/180, 131; 280/757; 238/14; 16/1 R;
301/47; 152/214, 226

[56] References Cited

U.S. PATENT DOCUMENTS

| 3,672,422 | 6/1972 | Greipel | 238/14 |
|---|---|---|---|
| 3,836,075 | 9/1974 | Botbol | 238/14 |

Primary Examiner—George F. Lesmes
Assistant Examiner—P. Thibodeau
Attorney, Agent, or Firm—Charles L. Lovercheck

[57] ABSTRACT

A traction device comprising a mat made of molded thermo-plastic material having a generally rectangular frame, a traction area and an approach area on each side of the traction area. The traction area occupies approximately half of the length of the mat and the approach areas are made of bars extending generally parallel to the sides of the mat and perpendicular to each other defining rectangular areas. The traction area is made of bars arranged at approximately 45° angles to the sides of the frame and intersecting each other at approximately right angles. The bars are generally T-shaped. The vertical bar of the T is generally elliptical and the horizontal bar is generally elliptical with a flat top surface.

4 Claims, 4 Drawing Figures

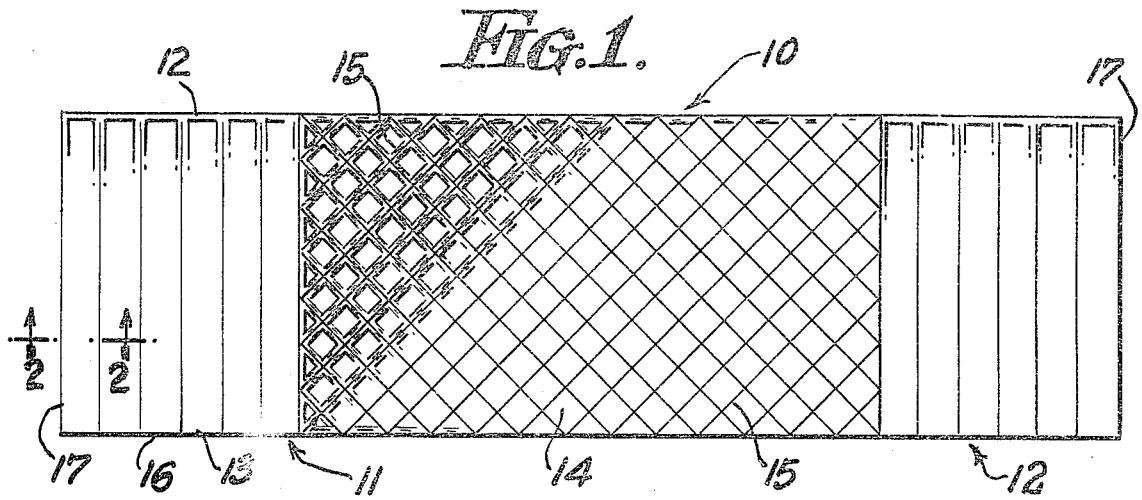
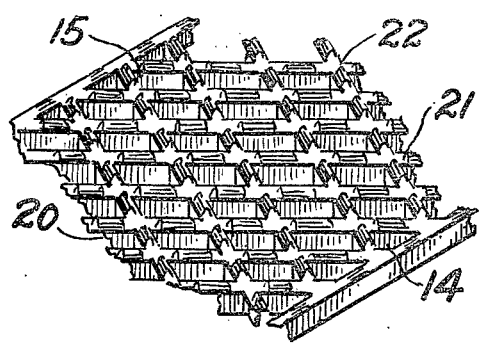
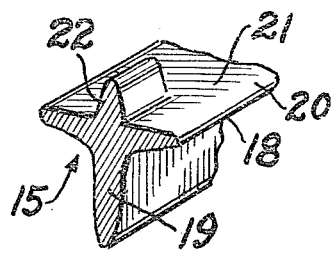

ANTI-SKID DEVICE FOR VEHICLES

STATEMENT OF THE INVENTION

This invention relates to improving a method to release a stuck vehicle in snow, ice or mud. The device is portable, light in weight, and adapted to be stored in the trunk of a vehicle. It may be made of a thermo-plastic material. The vehicle can be driven from a stuck position in snow, ruts, ice, mud or slippery road surfaces, by using one pad or two and by jacking up the rear end of the vehicle, then installing the traction device under the wheel and lowering it. For better traction, two of the pads can be used under the wheel that is stuck or one pad under each wheel.

OBJECTS OF THE INVENTION

It is an object of the invention to provide an improved traction device.

Another object of the invention is to provide an anti-skid device for vehicles and the like.

Another object of the invention is to provide a traction device that is simple in construction, economical to manufacture and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a top view of the traction device according to the invention.

FIG. 2 is a cross-sectional view taken on Line 2—2 of FIG. 1.

FIG. 3 is an enlarged partial section of the traction device.

FIG. 4 is another enlarged partial isometric view of the traction device.

DETAILED DESCRIPTION OF THE DRAWINGS

Now, with more particular reference to the drawings, the traction device is indicated generally at 10 and has a rectangular marginal frame 11 divided into three parts, an approach area 12, a departure area 13, and a traction area 14 between the approach area and the departure area. The approach area and the departure area are made somewhat differently than the traction area 14, since once the vehicle is moving, it does not require as much traction as is necessary before it moves.

The approach area and the departure area are both made of ribs that are disposed at right angles to the side edges 16 and the end edges 17 of the frame. The ribs are generally T-shaped in cross-section, as shown in FIGS. 2 and 4, and the vertical legs 19 are generally elliptical in shape and define diamond shaped holes, while their horizontal bars 20 are generally somewhat elliptical with a flat top surface 21. The traction part has bars 14 and 15 disposed at right angles to each other and intersect.

The part of the vertical leg 19 above the horizontal part 18 is generally flat, and the vertical bar 19 does not extend above the horizontal bar 20 at the points of intersection of the ribs as clearly shown in FIG. 4. This provides a higher traction area since the spaced lugs 22 that extend above the horizontal ribs 18 tend to be deformed in the direction of travel of the vehicle, thereby giving a binding effect on the tire ribs and giving the vehicle greater traction.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A traction device comprising,
    a relatively rigid, substantially flat elongated mat made of thermo-plastic material and having a width substantially wider than the width of a pneumatic tire of a motor vehicle,
    said mat having a traction area defining approximately one-half of the length of said mat and an approach area and a departure area at each end of said traction area,
    said approach area and said traction area being defined by ribs extending parallel to the said ends of said frame and integrally connected together to said frame,
    the said traction area having ribs extending at approximately 45° angles to said sides and to said ends of said mat and intersecting each other at 90° angles and integrally connected together at their point of intersection,
    said ribs being generally T-shaped in cross-section having a vertical leg and a horizontal leg,
    said vertical leg of said T being generally elliptical in shape and said horizontal legs of said T's being generally elliptical in shape having a flat top surface,
    spaced upwardly extending lugs are fixed to the top surface of said T-shaped bar, said lugs being separated by spaces at their point of intersection, thereby allowing said parts of said T-shaped bars above said horizontal bar to be deformed in the direction of movement of said vehicle, thereby providing greater traction.

2. The mat recited in claim 1 wherein spaced lugs are supported on the top of said ribs.

3. The traction device recited in claim 2 wherein said horizontal bars of said T's are integrally connected to each other at their point of intersection defining diamond-shaped openings through said mat.

4. In combination, at least two traffic devices, each device comprising,
    a relatively rigid, substantially flat elongated mat made of thermo-plastic material and having a width substantially wider than the width of a pneumatic tire of a motor vehicle,
    said mat having a traction area defining approximately one-half of the length of said mat and an approach area and a departure area at each end of said traction area,
    said approach area and said traction area being defined by ribs extending parallel to the said ends of said frame and integrally connected together to said frame,
    the said traction area having ribs extending at approximately 45° angles to said sides and to said ends of said mat and intersecting each other at 90° angles and integrally connected together at their point of intersection, said ribs being generally T-shaped in cross-section having a vertical leg and a horizontal leg, said vertical leg of said T being generally elliptical in shape and said horizontal legs of said T's being generally elliptical in shape having a flat top surface, spaced upwardly extending lugs are fixed to the top surface of said T-shaped bar, said lugs being separated by spaces at their point of intersection, thereby allowing said parts of said T-shaped bars above said horizontal bar to be deformed in the direction of movement of said vehicle, thereby providing greater traction, the approach end of one said mat overlying the departure end of the mat adjacent thereto whereby said bars of said first mat overlies the bars of the other said mat for holding said mats together in end to end relation.

* * * * *